US010103634B2

(12) United States Patent
Zeng et al.

(10) Patent No.: US 10,103,634 B2
(45) Date of Patent: Oct. 16, 2018

(54) POWER CONVERTER DEVICE BASED ON NORMALLY-ON TYPE SWITCHING DEVICES

(71) Applicant: DELTA ELECTRONICS, INC., Taoyuan (CN)

(72) Inventors: Jianhong Zeng, Taoyuan (CN); Chao Yan, Taoyuan (CN); Haoyi Ye, Taoyuan (CN); Peiqing Hu, Taoyuan (CN)

(73) Assignee: DELTA ELECTRONICS, INC., Taoyuan, Taiwan (CN)

( * ) Notice: Subject to any disclaimer, the term of this patent is extended or adjusted under 35 U.S.C. 154(b) by 0 days.

(21) Appl. No.: 15/064,687

(22) Filed: Mar. 9, 2016

(65) Prior Publication Data

US 2016/0294295 A1 Oct. 6, 2016

(30) Foreign Application Priority Data

Apr. 3, 2015 (CN) .......................... 2015 1 0155883

(51) Int. Cl.
*H02M 3/158* (2006.01)
*H02M 1/42* (2007.01)
*H02M 3/335* (2006.01)
*H02M 3/337* (2006.01)
*H02M 1/00* (2006.01)

(52) U.S. Cl.
CPC ......... *H02M 3/1588* (2013.01); *H02M 3/337* (2013.01); *H02M 3/33592* (2013.01);
(Continued)

(58) Field of Classification Search
CPC ............ Y02B 70/1491; Y02B 70/1466; Y02B 70/1475; H02M 3/33546; H02M 3/335;
(Continued)

(56) References Cited

U.S. PATENT DOCUMENTS 8,310,281 B2 * 11/2012 Draxelmayr .......... H02M 3/337
326/89
8,637,909 B1 * 1/2014 Vorhaus .............. H01L 27/0207
257/288
(Continued)

FOREIGN PATENT DOCUMENTS

CN 101772881 A 7/2010
CN 102480216 A 5/2012
(Continued)

OTHER PUBLICATIONS

Office Action dated Apr. 6, 2016 by the TW Office.
The 1st office action issued in the counterpart CN application No. 201510155883.8 dated Feb. 14, 2018, by the SIPO.

*Primary Examiner* — Gustavo Rosario Benitez
(74) *Attorney, Agent, or Firm* — Yunling Ren

(57) ABSTRACT

A power converter device, includes switching devices and a controller, to realize conversion between power supplies by controlling on and off the switching devices via the controller. The switching devices include: at least one normally-on type switching device and at least one normally-off type switching device both having an operation frequency greater than 1 kHz and connected in series. The controller outputs a first and second control signal to correspondingly control the normally-on type switching device and the normally-off type switching device to control the normally-off type switching device to be turned on after the normally-on type switching device to be turned off. The present disclosure uses the normally-off type switching device originally disposed in the circuit, having a voltage blocking ability, to realize directly usage of the normally-on type switching device to improve efficiency and power density of switching power supply.

20 Claims, 14 Drawing Sheets

(52) U.S. Cl.
CPC .............. *H02M 2001/007* (2013.01); *H02M 2001/0058* (2013.01); *Y02B 70/1466* (2013.01); *Y02B 70/1475* (2013.01); *Y02B 70/1491* (2013.01)

(58) Field of Classification Search
CPC ............ H02M 1/42; H02M 2001/007; H02M 3/3374; H02M 7/4807; H02M 7/4826; H02M 1/088; H02M 3/158; H02M 1/08; H02M 3/1588; H02M 3/33592; H02M 3/337; H02M 2001/0058
See application file for complete search history.

(56) References Cited

U.S. PATENT DOCUMENTS

| | | | | |
|---|---|---|---|---|
| 2005/0024028 | A1* | 2/2005 | Ying | H02M 3/1584 323/272 |
| 2007/0153553 | A1* | 7/2007 | Cebry | H02M 3/33592 363/16 |
| 2008/0122418 | A1* | 5/2008 | Briere | H02M 3/1588 323/282 |
| 2008/0253151 | A1* | 10/2008 | Bahramian | H02M 1/08 363/22 |
| 2010/0026208 | A1* | 2/2010 | Shteynberg | H05B 33/0815 315/297 |
| 2010/0149838 | A1* | 6/2010 | Artusi | H02M 1/4225 363/20 |
| 2015/0311796 | A1* | 10/2015 | Dubois | H02M 1/08 323/271 |

FOREIGN PATENT DOCUMENTS

| | | |
|---|---|---|
| CN | 103855919 A | 6/2014 |
| CN | 104038070 A | 9/2014 |
| TW | 201424230 A | 6/2014 |
| WO | 2014083274 A2 | 6/2014 |
| WO | 2014126922 A1 | 8/2014 |

\* cited by examiner

POWER CONVERTER DEVICE BASED ON NORMALLY-ON TYPE SWITCHING DEVICES

CROSS REFERENCE TO RELATED APPLICATION

The present application is based upon and claims priority to Chinese Patent Application No. 201510155883.8, filed Apr. 3, 2015, the entire contents of which are incorporated herein by reference.

TECHNICAL FIELD

The present disclosure generally relates to a power converter device, and more particularly, to a power converter device based on normally-on type switch devices.

BACKGROUND

Characteristics of active power devices, which are important components in a switching power supply, are critical to the performance of the switching power supply. With the development of semiconductor technologies, conversion efficiency of circuits composed of active power devices such as Power Factor Correction (PFC) circuits or Direct Current (DC) to DC (D2D) conversion circuits is up to 97% at present, and the power density of these circuits has reached a considerably high level. However, the characteristics of Si-material-based active power devices have approached to a theory limit and there is relatively small space left for further development, thereby further improvement of efficiency and power density of switching power supplies is impeded.

Active power devices based on wide band gap materials such as gallium nitride (GaN) or silicon carbide (SiC) have relatively small internal resistance and small switching loss, thereby are capable of bearing relatively high operation temperature, and thus the efficiency and power density of the switching power supplies can be further improved.

Active power devices based on wide band gap materials usually include three terminals, one terminal among which is a control terminal, i.e., a gate electrode, configured to control on and off of the devices. Taking Metal-Oxide-Semiconductor Field Effect Transistor (MOSFET) as an example, the three terminals are: a gate electrode, a source electrode and a drain electrode. Generally, the active power devices can be classified into two types: a normally-on type and a normally-off type. Taking a normally-on type MOSFET device as an example, when the voltage between the gate electrode and the source electrode is zero, the device is turned on; and when the voltage between the gate electrode and the source electrode is a negative voltage, the device is turned off. Taking a normally-off type MOSFET device as an example, when the voltage between the gate electrode and the source electrode is a positive voltage, the device is turned on; and when the voltage between the gate electrode and the source electrode is zero, the device is turned off. However, the problem when normally-on type switching devices are used is circuit start-up problem. This problem will be explained taking a Buck circuit as an example.

FIG. 1 is a schematic diagram for illustrating a Buck circuit composed of normally-on type switching devices. As shown in FIG. 1, switching elements Q1 and Q2 in the Buck circuit are normally-on type semiconductor devices, for example, normally-on type GaN devices. The circuit is desired to output a voltage from a middle point O to a capacitor Co via an inductor L1. However, in the initial state of the circuit, i.e., at the time when no power is applied on the circuit, the DC input voltage Vin is zero, and an auxiliary power supply Vaux and a control/driving module C&D do not provide control signals to Q1 and Q2, and thus the voltages between the gate electrodes and the sources electrodes of Q1 and Q2 are zero, i.e., Q1 and Q2 are in an on state. When the circuit is powered up, i.e., Vin is set up and is not equal to zero, since the timing when the Vaux and C&D set up control signals is later than the timing when Vin is set up, i.e., the voltages between the gate electrodes and the source electrodes of Q1 and Q2 have not yet reached a negative voltage to keep Q1 and Q2 being in an off state, and thus the currents in Q1 and Q2 will flow from a positive terminal "+" of Vin directly to the ground G and thereby the circuit may be damaged. That is to say, a problem of start-up exists in a circuit composed of normally-on type switching devices.

In view of FIG. 1, FIG. 2 shows a schematic diagram illustrating how to solve the start-up problem existing in a circuit composed of normally-on type switching devices by using an electronic switch. As shown in FIG. 2, in the loop formed by the Vin, Q1 and Q2, an electronic switch Qin is connected in series. Qin is a normally-off type switch, for example, a Metal Oxide Semiconductor (MOS) device based on Si. The voltage at the gate electrode of the normally-off type switching device is zero before the power is applied, i.e., the switching device is in an off state. When Vin is applied to the circuit, during the time period before the C&D finishes setting up of control signals, Qin is in an off state. Thus, the phenomenon that the currents in Q1 and Q2 directly flow into the ground can be avoided, and thereby the safety of the circuit may be guaranteed. When the Vaux and the C&D finish setting up of the control signals, i.e., when the driving signals of Q1 and Q2 start to work normally, Qin is kept being in an on state. In this way, a safe start-up of the circuit is realized. However, one drawback of such solution is that the voltage stress of Qin is the same as that of Q1 and Q2, both of which are Vin. Qin is generally a MOS device based on Si, and in a case when Qin is under the same voltage level as semiconductor devices based on wide band gap material such as MOS devices based on GaN, the loss caused by the on-resistance of Qin is not negligible. Further, such an electronic switch does not serve as a switching device that performs power conversion in a power conversion circuit, but generally serves as an auxiliary electronic switch when the power conversion circuit adopts normally-on type devices. Generally, the electronic switch has a relatively low operation frequency, usually lower than 1 kHz.

In order to solve the problem of the withstand voltage of the additional Si-based device and to make the GaN-based device capable of replacing the conventional Si-based MOS device without changes in control and driving schemes, a solution in FIG. 3 is proposed. FIG. 3 is a schematic diagram in which a combination of serially connected normally-off type switching device and normally-on type switching device is used to simply replace normally-off type switching devices in the circuit. As shown in FIG. 3, a Si-based normally-off type switching device QL having a withstand voltage of 40V and a GaN-based normally-on type switching device QH having a withstand voltage of 600V are connected in series to form a combination. A source electrode of QH is connected with a drain electrode of QL, and a gate electrode of QH is connected with a source electrode of QL. The drain electrode D of QH serves as the drain electrode of this combination, and the source electrode S of QL serves as the source electrode of this combination. The combination may have normally-off control characteristics similar to conventional Si-based device, and the advantages of the GaN device are also utilized. However, the solution as shown in FIG. 3 increases driving loss, loop inductance, electromagnetic interference and reverse recovery loss. Further, parameter matching of devices is hard to be fulfilled, and thereby the good characteristics of the GaN-based devices cannot be exerted thoroughly.

SUMMARY

Compared with conventional application of normally-on type devices, the present disclosure provides an application of normally-on type devices in a power converter device. The present disclosure provides a power converter device which differs from conventional power converter devices in that switching devices that perform power conversion in the power converter device includes at least two switching devices; one of the switching devices is a normally-on type switching device having an operation frequency greater than 1kHz, and the other one of the switching devices is a normally-off type switching device having an operation frequency greater than 1 kHz. A controller in the power converter device outputs a first control signal and a second control signal to correspondingly control the normally-on type switching device and the normally-off type switching device such that the second control signal controls the normally-off type switching device to be turned on after the first control signal controls the normally-on type switching device to be turned off.

In the power converter device provided by the present disclosure, combination of the normally-on type device and the normally-off type device is utilized in the circuit, and thus the usage of the normally-on type device is realized, and the efficiency of the power supply may be improved and meanwhile no circuit structure changes of the power converter device need to be introduced.

DETAILED DESCRIPTION

The present disclosure will be described in detail with reference to FIGS. 4 to 14, in which like reference signs refer to like devices or signals. Further, if a crossing exists between line sections serving as connection lines, when the crossing is indicated with a black dot "•", it means that the crossing is a connection point; when the crossing is not indicated with a black dot "•", it means that the crossing is not a connection point and the line sections cross with each other but are not connected with each other. The reference signs of respective elements do not only represent the elements themselves but also serve as algebraic symbols representing the capacity of the elements.

Figure 1:
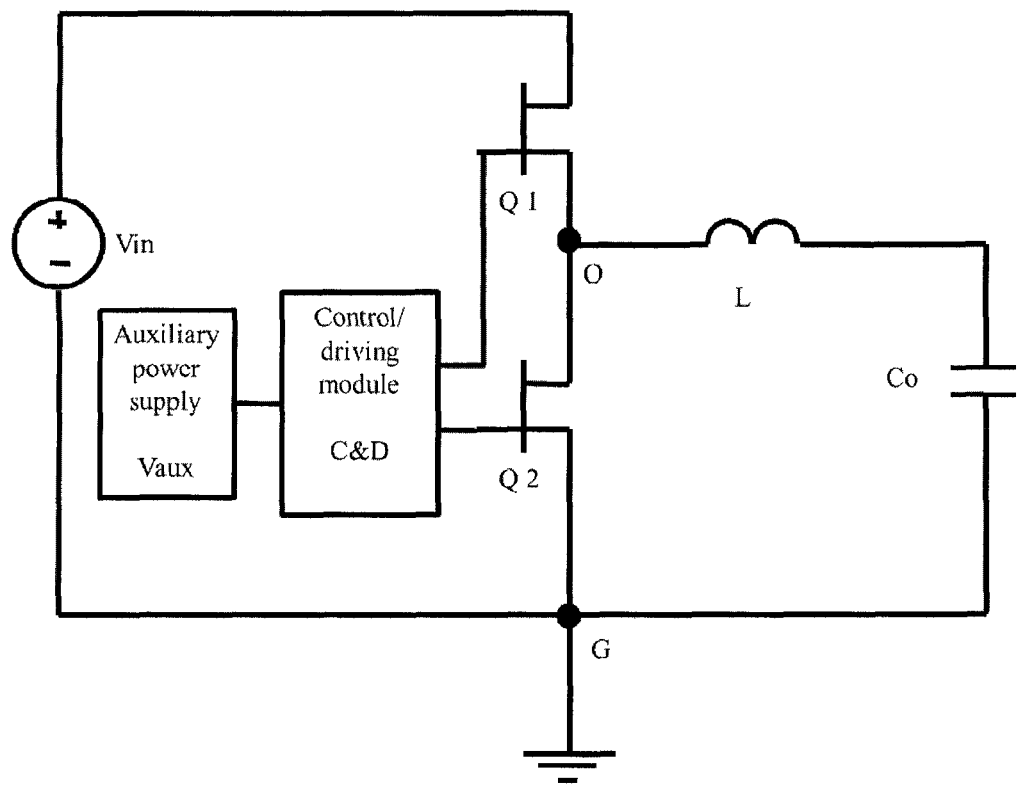
FIG. 1 shows a schematic diagram illustrating a Buck circuit in which conventional normally-on type switching devices are used.
Figure 2:
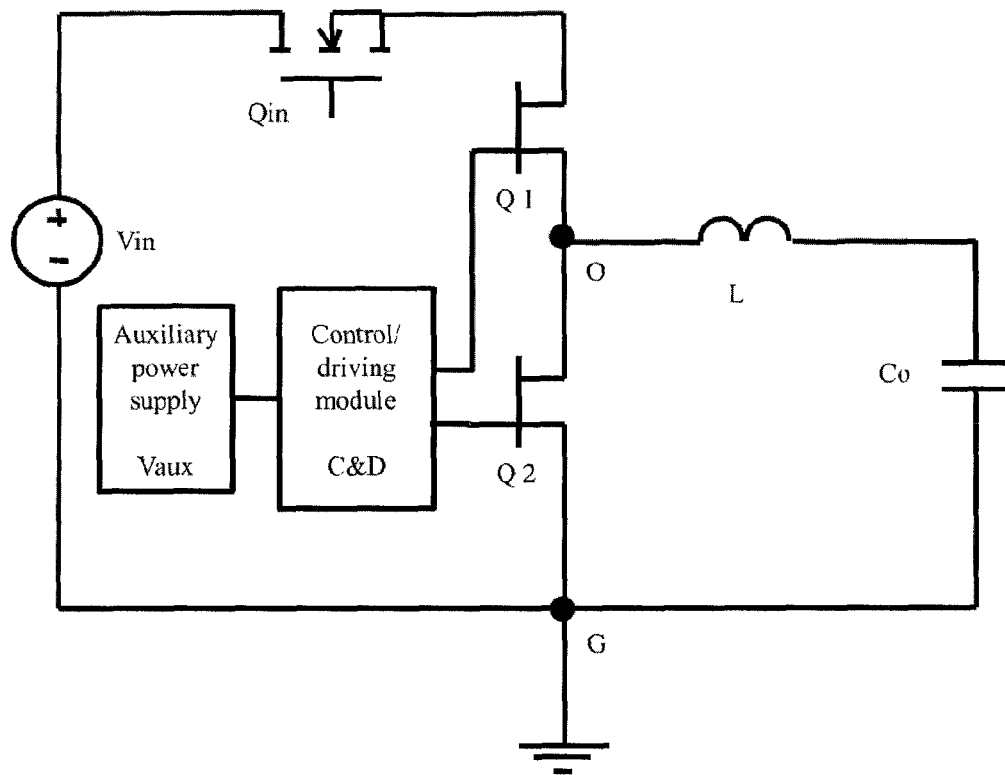
FIG. 2 shows a schematic diagram illustrating a traditional method for solving the start-up problem existing in a Buck circuit in which normally-on type switching devices are used, by using an electronic switch.
Figure 3:
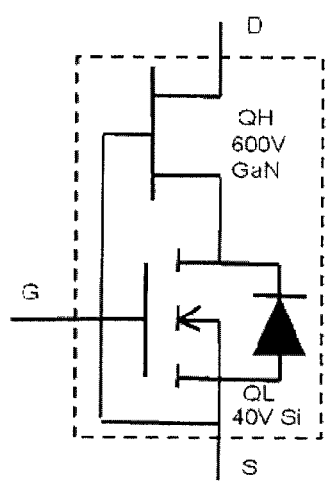
FIG. 3 shows a schematic diagram illustrating a conventional method for solving the problem when normally-on type devices are applied as switching device.

Hereinafter, the devices or device combinations defined in the present disclosure differ from the Qin shown in FIG. 2. The withstand voltage level of Qin has to be greater than or equal to Vin and Qin has a relatively low operation frequency of usually lower than 10 Hz, which is far lower than the operation frequency (for example, above 1 kHz) of the switching elements for forming arms of the power converter in the circuit. Although the devices or device combinations in the present disclosure have a withstand voltage level greater than or equal to Vin, the devices or device combinations themselves are switching elements for forming the arms of the power converter and have an operation frequency equal to one of the operation frequencies of the power converter, usually above 1kHz, therefore the devices or device combinations in the present disclosure are not the additionally added electronic switch in FIG. 2.

The power converter device provided by the present disclosure will be described in detail with reference to FIGS. 4 to 14.

Figure 4:
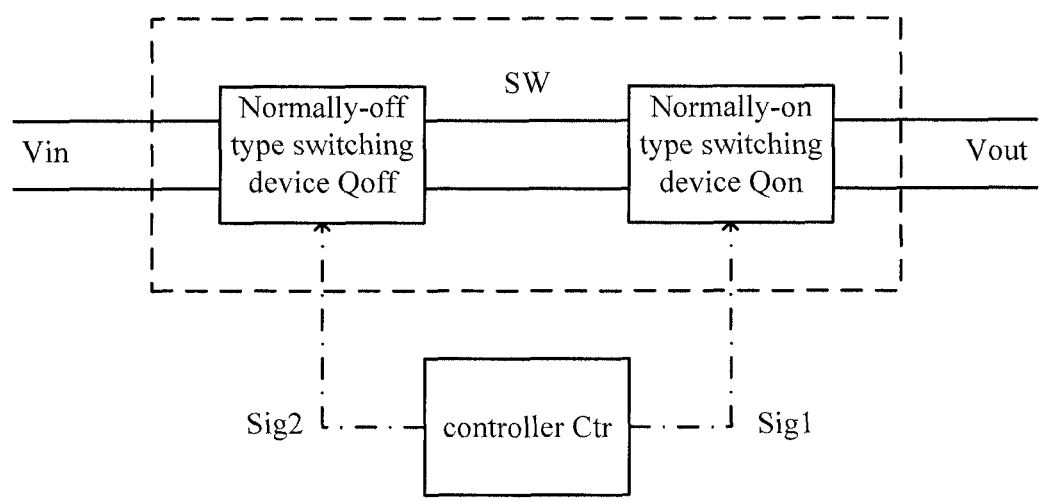
FIG. 4 shows a schematic diagram illustrating a power converter device according to a first embodiment of the present disclosure.

As shown in FIG. 4, in the power converter device according to a first embodiment of the present disclosure, the power converter device includes at least two switching devices SW (for convenience of description, the switching devices are indicated by a dotted-line frame) and a controller Ctr. The controller Ctr controls on and off of the two switching devices SW to realize the conversion from the input voltage Vin to the output voltage Vout. The switching devices SW include at least one normally-on type switching device Qon having an operation frequency greater than 1kHz, for example, and at least one normally-off type switching device Qoff having an operation frequency greater than 1kHz, for example. The normally-on type switching device Qon and the normally-off type switching device Qoff are connected in series. The controller Ctr outputs a first group of control signals Sig 1 and a second group of control signals Sig2 to correspondingly control the normally-on type switching device Qon and the normally-off type switching device Qoff such that the second group of control signals Sig2 control the normally-off type switching device Qoff to be turned on after the first group of control signals Sig 1 control the normally-on type switching device Qon to be turned off.

Figure 5:
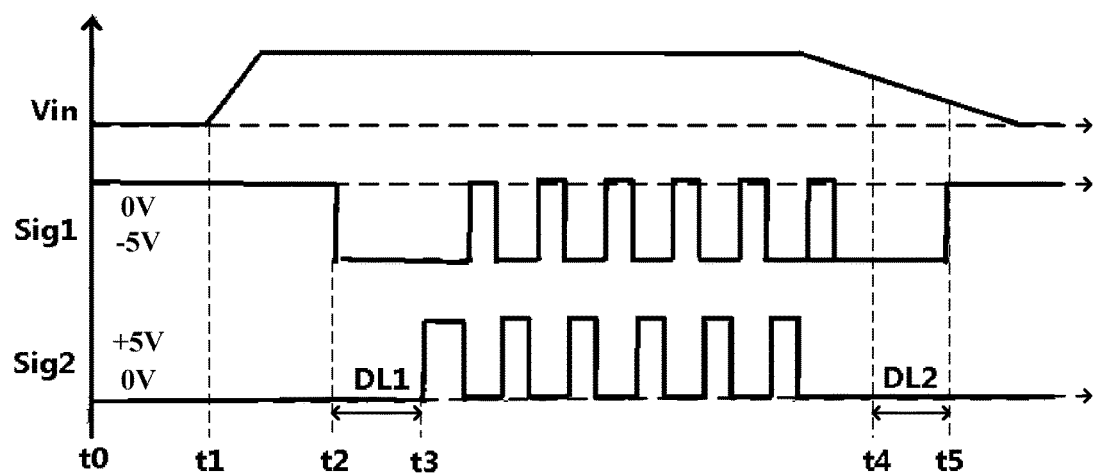
FIG. 5 shows a schematic diagram illustrating operation timing sequence of the power converter device according to the first embodiment of the present disclosure.

FIG. 5 shows a schematic diagram illustrating operation timing sequence of the power converter device according to the first embodiment of the present disclosure. As shown in FIG. 5, Vin is a waveform of an input voltage, the first group of control signals Sig1 and the second group of control signals Sig2 are gate-source driving voltage waveforms of the normally-on type switching device Qon and the normally-off type switching device Qoff. As shown in FIG. 5, at the moment of t0, Vin equals to zero, and Sig1 and Sig2 equal to zero, and thus the normally-on type switching device Qon is in an on state and the normally-off type switching device Qoff is in an off state. At the moment of t1, setting up of Vin is started, and Sig1 and Sig2 are both zero at this moment. At the moment of t2, a negative voltage appears in Sig 1, i.e., the normally-on type switching device Qon is in an off state and the turning-off ability of the normally-on type switching device Qon is established. Sig2 is still equal to zero at this moment, i.e., the normally-off type switching device is still in an off state. At the moment of t3, a positive pulse starts to appear in Sig2, i.e., the applying of power is finished, and the circuit enters into a normal operation state, and the normally-off type switching device Qoff enters into normal high frequency operation state at this moment. The operation frequency of the normally-off type switching device and the normally-on switching device Qon may be the same or not.

As shown in FIG. 5, in the time period before the driving voltage of the normally-on type switching device Qon has the ability of turning-off the normally-on type switching device Qon, the normally-off type switching device Qoff is in an operation state that can isolate Vin from the normally-on type switching device Qon, and thus safety of the circuit is guaranteed. After the driving voltage of the normally-on type switching device Qon has the ability of turning-off the normally-on type switching device Qon, both the normally-off type switching device Qoff and the normally-on type switching device Qon are in high frequency operation states. That is to say, the moment (i.e., t3) when the normally-off switching device Qoff is turned on after a long lasting off state (i.e., from t0 to t3) is later than the moment (i.e., t2) when the normally-on type switching device Qon starts to be turned off after a long lasting on state (i.e., from t0 to t2), and the time interval between the two moments is DL1. In this way, the existence of DL1 can guarantee reliable start-up of the circuit to realize a normal operation.

In the power converter device of the present application, the normally-off type switching device Qoff originally disposed in the circuit, having a voltage blocking ability, is used to realize direct usage of the normally-on type switching device Qon, and thus the circuit is simple and may sufficiently exert the good characteristics of the normally-on type switching device. Consequently, the efficiency of the whole power converter device may be improved.

Similarly, for the safety of the circuit, as shown in FIG. 5, the moment t5 when the normally-on type switching device Qon transits from a controllable state in high frequency operation to a state without turning-off ability is later than the moment t4 when the normally-off type switching device Qoff enters into a long lasting off state, and the time interval between the two moments is DL2. In this way, the reliable turning-off of the circuit is guaranteed.

To facilitate understanding of the present disclosure, the present disclosure will be described with more specific examples.

Figure 6:
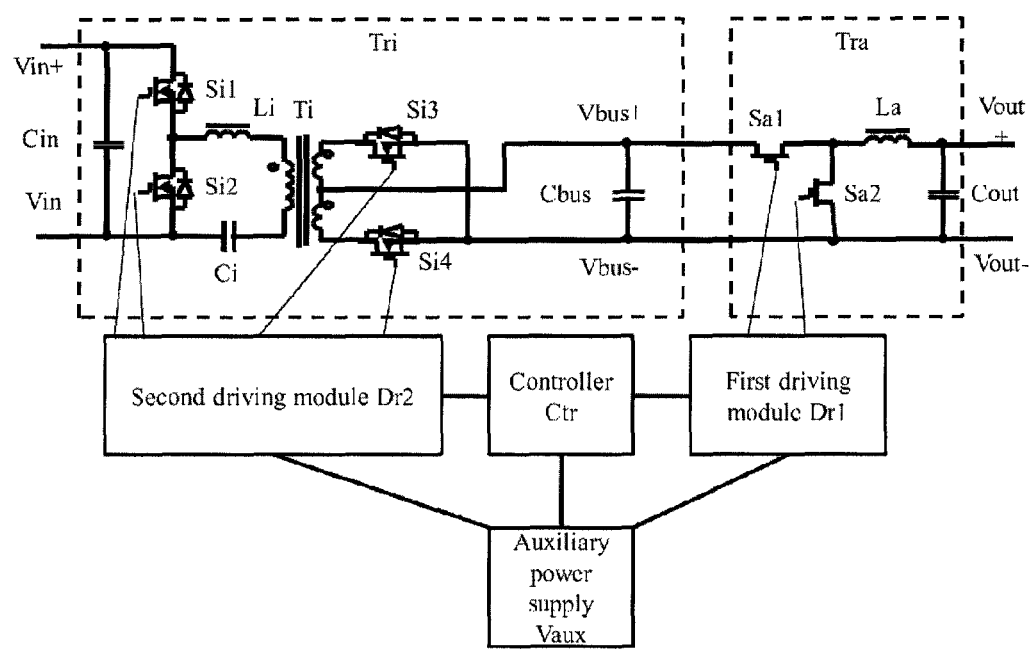
FIG. 6 shows a schematic diagram illustrating a power converter device according to a second embodiment of the present disclosure.
Figure 7:
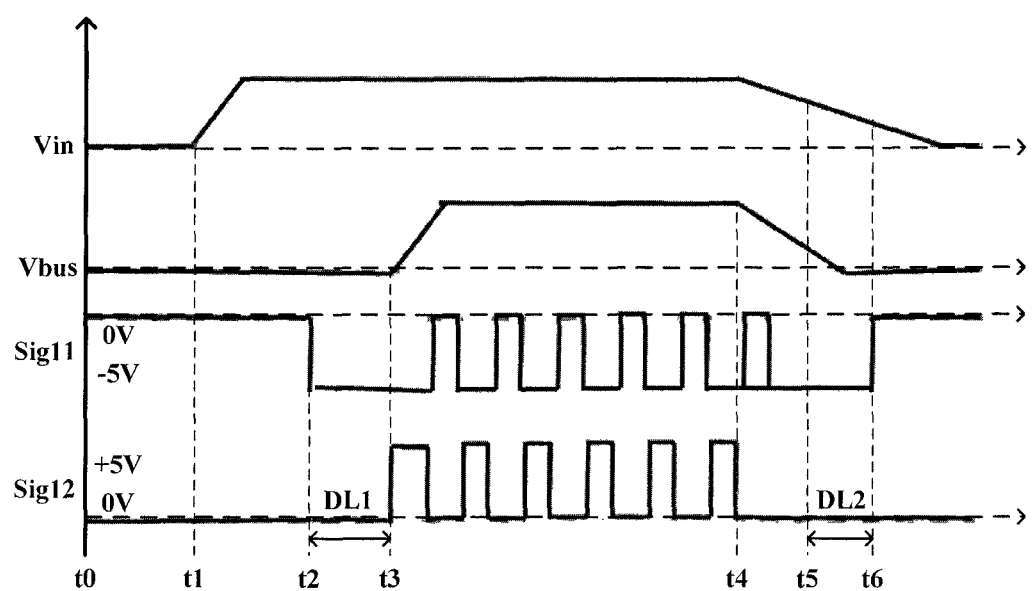
FIG. 7 shows a schematic diagram illustrating operation timing sequence of the power converter device according to the second embodiment of the present disclosure.

FIG. 6 shows a schematic diagram illustrating a power converter device according to a second embodiment of the present disclosure, and FIG. 7 shows a schematic diagram illustrating operation timing sequence of the power converter device according to the second embodiment of the present disclosure.

As shown in FIG. 6 the power converter device in the second embodiment is a DC-DC converter device. The DC-DC converter device includes a structure of two stages in cascade.

A preceding stage D2D converter is an isolated DC converter (DCX) Tri which includes: normally-off type switching devices Si1, Si2, Si3, and Si4; an input capacitor Cin; a resonant inductor Li; a resonant capacitor Ci; a transformer Ti; and a middle capacitor Cbus. The connection relationship of these elements is as shown in FIG. 6. Tri receives input voltages Vin+ and Vin− and middle voltages Vbus+ and Vbus− are generated at the middle capacitor Cbus.

A post stage D2D converter is a non-isolated point of load (POL) converter Tra, which includes: normally-on type switching devices Sa1 and Sa2; a storage inductor La; and an output capacitor Cout. The connection relationship of these elements is as shown in FIG. 6. Tra receives the middle voltages Vbus+ and Vbus− and generates the output voltages Vout+ and Vout− at the output capacitor Cout.

The DC-DC converter device according to the second embodiment further includes a controller Ctr, a first driving module Dr1, a second driving module Dr2 and an auxiliary power supply Vaux. Vaux provides operation voltage for Ctr and may be another power supply different from the input voltages Vin+ and Vin−. Ctr generates a first group of control signals Sig11 (here, the first group of control signals are indicated by two thin solid lines from the DR1 to the gate electrodes of switching devices Sa1 and Sa2) and a second group of control signals Sig12 (here, the second group of control signals are indicated by four shin solid lines from DR2 to the gate electrodes of the switching devices Si1, Si2, Si3 and Si4). The first group of control signals Sig11 control the normally-on type switching devices Sa1 and Sa2 correspondingly via the first driving module Dr1, and the second group of control signals Sig12 control the normally-off type switching devices Si1, Si2, Si3 and Si4 correspondingly via the second driving module Dr2.

In the two-stage circuit as shown in FIG. 6, the switching devices in each stage have to cooperate with each other in the timing sequence to generate respective output voltages, i.e., the middle voltages Vbus+ and Vbus− and the output voltages Vout+ and Vout−. However, the switching devices in one of the two stages do not have to cooperate with the switching devices in the other stage in the timing sequence, i.e., the switching devices of different stages may cooperate with each other or not.

Generally, an energy storage unit may be connected between the two stages of circuits as shown in FIG. 6, and the energy storage unit may include at least a capacitive element, for example, a capacitor Cbus, to facilitate energy delivery between the preceding and post stages. Generally, the preceding stage circuit generates a voltage on the energy storage unit (especially the capacitive element) as the output of the preceding stage and the input of the post stage. It can be seen that, when a plurality stages of circuits are cascaded, for a post stage circuit, a preceding stage circuit inherently possess the function of the normally-off type switching device as described above.

As shown in FIG. 6, the preceding stage circuit Tri is a D2D converter having an isolation function, and may be a resonant circuit such as a half-bridge resonant circuit (LLC) or may be a pulse width modulation (PWM) circuit such as a half-bridge circuit, a full-bridge circuit, a flyback converter, or a forward converter. Further, the preceding stage circuit may operate in an open loop stage (for example DCX) or a closed loop state. Rather, the preceding stage circuit may be an isolation circuit having a transformer, or may be a circuit not having isolation function. The post stage circuit may be a POL composed of a Buck circuit, and may operate in a closed loop or an open loop manner. Taking a DCX+POL structure as an example, since the DCX may isolate the secondary side from the primary side, the DCX may be deemed as a normally-off type switching device. As shown in FIG. 6, the switching elements in the preceding stage circuit employ the normally-off type devices and the preceding stage is deemed as a normally-off type device. Thus, normally-on type devices may be directly employed as the switching devices in the POL which serves as the post stage circuit, i.e., the POL is deemed as a normally-on type device. The preceding stage as a normally-off type device is in series with the post stage as a normally-on type device. In the circuit in FIG. 6, only the timing sequence of the normally-on type device and the normally-off device needs to be dealt with, and no additional power devices have to be added as the conventional technologies.

As shown in FIG. 7, the operation procedure of the power converter device as shown in FIG. 6 may be as follows. The normally-off type switching device Si1, Si2, Si3 and Si4 form a normally-off type isolation device combination. When Vin is applied, i.e., at the moment of t1, even if the normally-on type switching devices Sa1 and Sa2 do not have the self-blocking ability (as shown in FIG. 7, Sig11=0), since sig12=0 at this moment, i.e., the normally-off type switching devices Si1, Si2, Si3 and Si4 are in an off state and can withstand Vin by themselves, Vbus, i.e., the voltage on the energy storage unit Cbus between the preceding and post stages of circuits, which is the real input voltage of the normally-on type switching devices Sa1 and Sa2, maintains approaching to zero potential, and thus no damage may be inflicted on the normally-on type switching devices Sa1 and Sa2. After the driving voltage of the normally-on type switching devices Sa1 and Sa2 can provide turning-off signals at the moment of t2, i.e., after the gate voltage is lower than the turn-off threshold (for example, −5V), the normally-on type switching devices Sa1 and Sa2 may turn off by themselves, the normally-off type switching devices Si1, Si2, Si3 and Si4 can start normal high frequency operation to make Vbus to rise, and then the post circuit (for example the Buck circuit) in which the normally-on type switching devices Sa1 and Sa2 is disposed can start normal high frequency operation. As shown in FIG. 7, the timing when the normally-on type switching devices Sa1 and Sa2 start normal high frequency operation is later than the timing when the normally-off type switching devices Si1, Si2, Si3 and Si4 start normal high frequency operation, by a delayed time DL1, i.e., after t3. Actually, applying of high frequency driving voltage on the gates of the normally-on type switching devices Sa1 and Sa2 may start even earlier, for example, start at t2. In this way, normally-on devices may be directly used at some positions in the circuit as long as the applying of timing sequence of the driving voltages of respective devices in the circuit is reasonably arranged, and no additional costs are involved.

Similarly, for safety of the circuit, as shown in FIG. 7, the moment t6 when the normally-on type switching devices Sa1 and Sa2 transit from a controllable state in high frequency operation to a state without turning-off ability is later than the moment t5 when the normally-off type switching devices Si1, Si2, Si3 and Si4 enter into a long lasting off state, and the time interval between the two moments is DL2. In this way, the reliable turning-off of the circuit is guaranteed.

Figure 8:
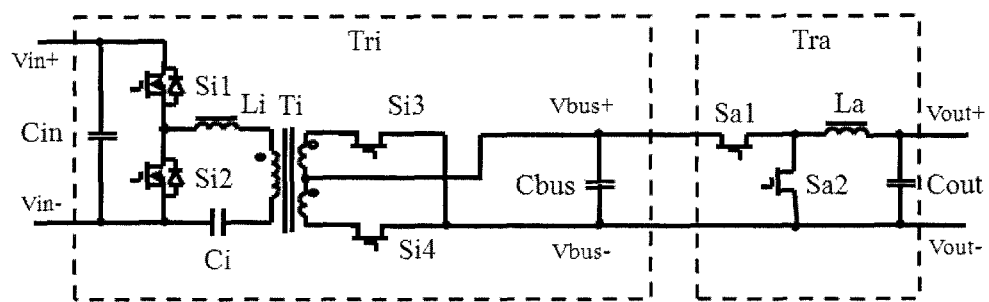
FIG. 8 shows a schematic diagram illustrating a power converter device according to a third embodiment of the present disclosure.

FIG. 8 shows a schematic diagram illustrating a power converter device according to a third embodiment of the present disclosure. As shown in FIG. 8, the solution in FIG. 8 is an improvement of the solution in FIG. 6, and in the solution of FIG. 8 the usage range of the normally-on type switching devices is extended to the switching devices Si3 and Si4 at the secondary side of the transformer Ti in the preceding stage of the isolated DC converter so as to exert the good characteristics of the normally-on type switching devices.

Figure 9:
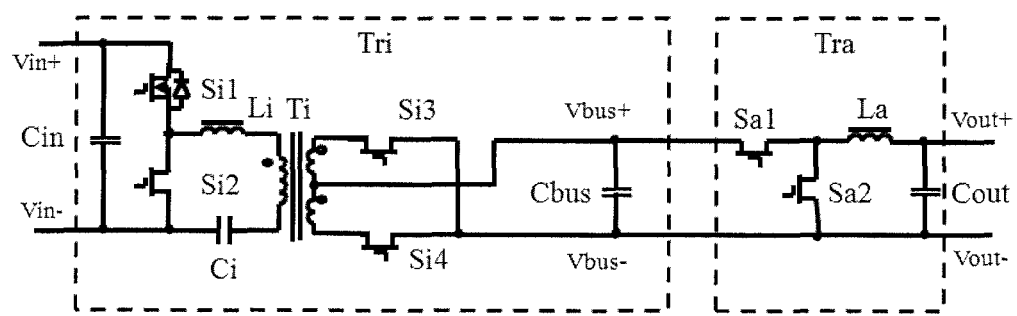
FIG. 9 shows a schematic diagram illustrating a power converter device according to a fourth embodiment of the present disclosure.

FIG. 9 shows a schematic diagram of a power converter device according to a fourth embodiment of the present disclosure. As shown in FIG. 9, the solution in FIG. 9 is an improvement of the solution in FIG. 8, and in the solution of FIG. 9 the usage range of the normally-on type switching devices is extended to the switching device Si2 at the primary side of the transformer Ti in the preceding stage of the isolated DC converter so as to more sufficiently exert the good characteristics of the normally-on type switching devices.

Figure 10:
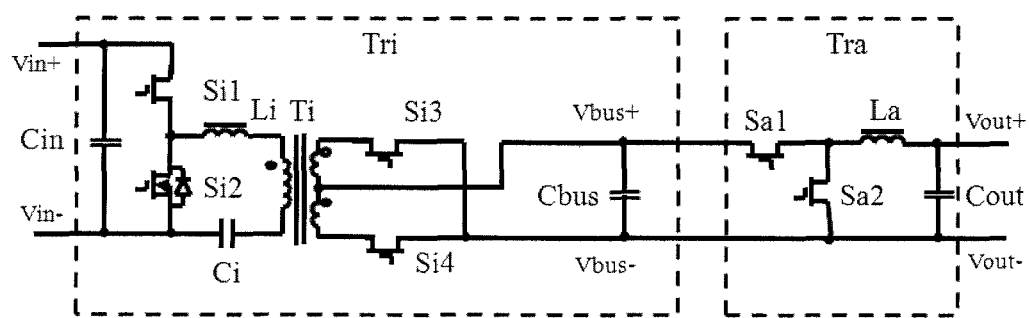
FIG. 10 shows a schematic diagram illustrating a power converter device according to a fifth embodiment of the present disclosure.

FIG. 10 shows a schematic diagram of a power converter device according to a fifth embodiment of the present disclosure. As shown in FIG. 10, the solution in FIG. 10 is a modification of the solution in FIG. 9, and in the solution of FIG. 10 the usage range of the normally-on type switching devices is extended to the switching device Si1 at the primary side of the transformer Ti in the preceding stage of the isolated DC converter, and Si2 is kept being a normally-off type switching device. As a result, one of ordinary skill in this art may further appreciate the design flexibility of circuits brought by the technical solutions of the present disclosure.

Figure 11:
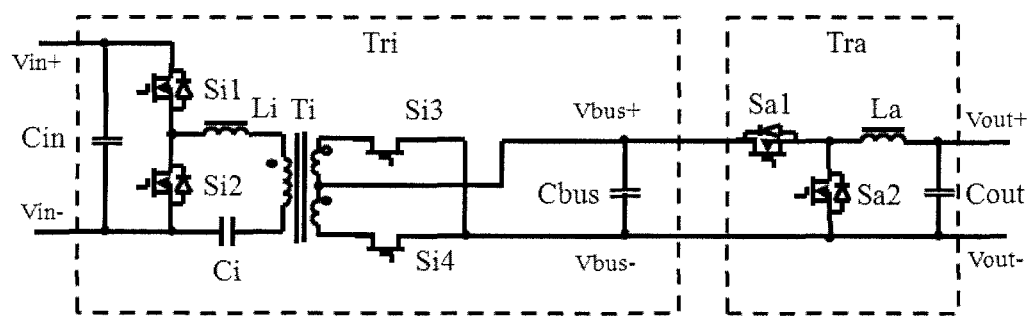
FIG. 11 shows a schematic diagram illustrating a power converter device according to a sixth embodiment of the present disclosure.

FIG. 11 shows a schematic diagram of a power converter device according to a sixth embodiment of the present disclosure. As shown in FIG. 11, the solution in FIG. 11 is a further improvement of the solution in FIG. 8. In the solution of FIG. 11, only a part of the switching devices in the preceding stage (for example, switching devices Si3 and Si4) are normally-on type switching device, and in the switching devices of the post stage DC-DC conversion circuit, switching devices such as Sa1 and Sa2 are kept being normally-off type switching devices for the purpose of preventing reverse flowing of external current. Thus, the solution in FIG. 11 is more applicable in an application such as charging a storage battery or connecting a plurality of power supplies in parallel. Rather, in other embodiments, only one switching device in the post stage DC-DC conversion circuit may be kept being a normally-off switching device for prevent reverse flowing of external current.

Figure 12:
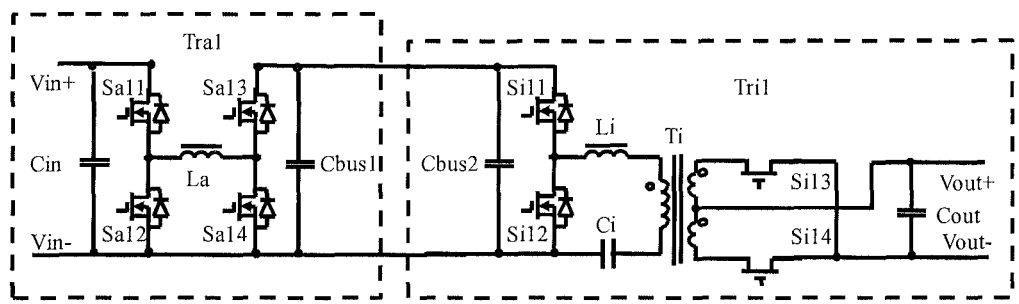
FIG. 12 shows a schematic diagram illustrating a power converter device according to a seventh embodiment of the present disclosure.
Figure 13:
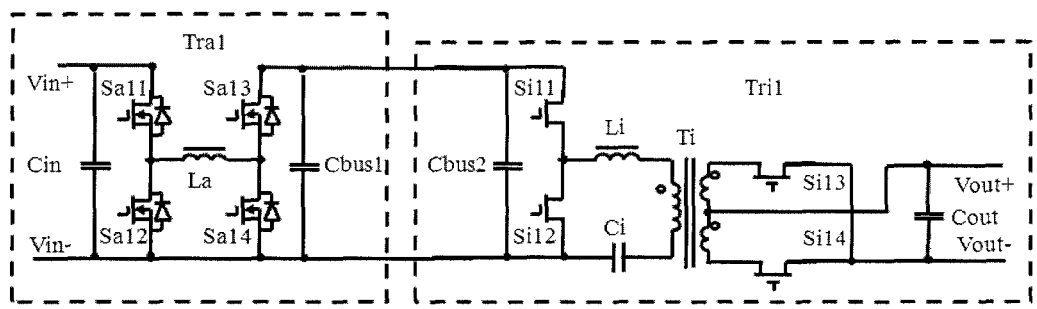
FIG. 13 shows a schematic diagram illustrating a power converter device according to an eighth embodiment of the present disclosure.
Figure 14:
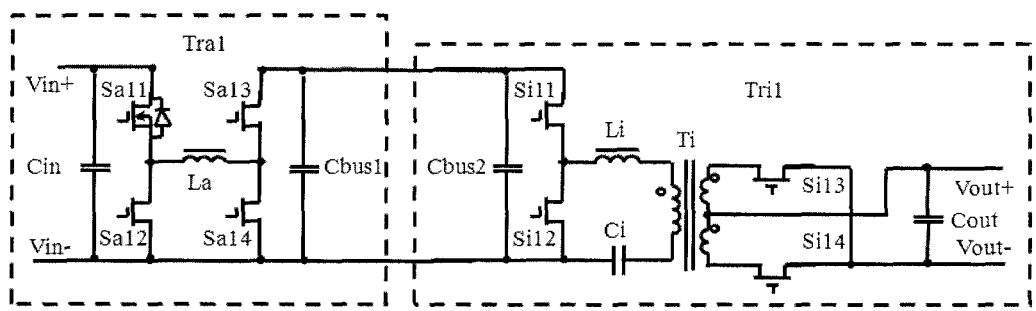
FIG. 14 shows a schematic diagram illustrating a power converter device according to a ninth embodiment of the present disclosure.

FIG. 12 shows a schematic diagram of a power converter device according to a seventh embodiment of the present disclosure. FIG. 13 shows a schematic diagram of a power converter device according to an eighth embodiment of the present disclosure. FIG. 14 shows a schematic diagram of a power converter device according to a ninth embodiment of the present disclosure. According to the description of FIGS. 12 to 14, in the power converter device of the present disclosure, the preceding stage DC-DC conversion circuit may be a non-isolated regulated D2D conversion circuit Tra1, and the post stage D2D conversion circuit may be an isolated non-regulated D2D conversion circuit Tri1. The elements included in the circuits and the connection relationships among the elements are as shown in FIGS. 12 to 14. The preceding stage as a normally-off type device is in series with the post stage as a normally-on type device. Since the operation procedure is similar to that of FIGS. 6 and 11, and thus detailed descriptions are omitted here.

According to the power converter device of the present application, the normally-off type switching devices which have a voltage blocking ability originally disposed in the circuit is used to realize direct usage of the normally-on type switching device, and thus the circuit is simple and involves low costs, and may sufficiently exert the good characteristics of the normally-on type switching device. Consequently, the efficiency and power density of the switching power supply may be further improved.

Although the present disclosure has been described with reference to typical embodiments, it should be understood that the terminologies herein are for illustration purposes rather than to limit the present invention. The present disclosure can be implemented in many specific embodiments without departing from the spirit and scope of the present disclosure, and thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A power converter device, receiving power from a power supply, wherein the power converter device comprises: switching devices comprising: at least one normally-on type switching device having an operation frequency greater than 1 kHz; and at least one normally-off type switching device having an operation frequency greater than 1 kHz and connected in series with the at least one normally-on type switching device; and a controller outputting a first control signal and a second control signal to correspondingly control the at least one normally-on type switching device and the at least one normally-off type switching device such that, from a time at which an input voltage applied on the power converter device begins to rise to a time at which the normally-off type switching device is turned on for the first time in start-up of the power converter device, the second control signal controls the normally-off type switching device to be turned on after the first control signal controls the normally-on type switching device to be turned off and generate an off time period of the switching devices, and when the normally-off type switching device has been turned on for the first time, the normally-on type switching device is not turned on until the normally-off type switching device is turned off again.

2. The power converter device according to claim 1, wherein when the power converter device is turned off, after the second control signal controls the normally-off type switching device to be turned off, the first control signal maintains turning off the normally-on type switching device for a preset time period.

3. The power converter device according to claim 2, wherein, after maintaining turning off the normally-on type switching device for the preset time period, the first control signal is removed.

4. The power converter device according to claim 1, wherein the power converter device is a DC-DC conversion device.

5. The power converter device according to claim 4, wherein the power converter device is a DC-DC conversion device having two stages in cascade, and the DC-DC conversion device having two stages in cascade comprises a preceding stage DC-DC conversion circuit and a post stage DC-DC conversion circuit.

6. The power converter device according to claim 5, wherein the power converter device further comprises an energy storage unit, and the energy storage unit is connected between the two stages.

7. The power converter device according to claim 5, wherein the DC-DC conversion device comprises an isolated non-regulated DC-DC conversion circuit and a non-isolated regulated DC-DC conversion circuit.

8. The power converter device according to claim 7, wherein the isolated non-regulated DC-DC conversion circuit comprises a transformer having a primary side and a secondary side, both of which are connected to the switching devices.

9. The power converter device according to claim 8, wherein the primary side of the transformer is connected to two of the switching devices, and the two switching devices constitute a half-bridge inverter circuit, and a terminal of the primary side of the transformer is connected to an output terminal of the half-bridge inverter circuit.

10. The power converter device according to claim 9, wherein one of the two switching devices is the normally-on type switching device and the other one of the two switching devices is the normally-off type switching device.

11. The power converter device according to claim 8, wherein the secondary side of the transformer is connected to two of the switching devices, wherein
the two switching devices are the normally-off type switching devices; or
one of the two switching devices is the normally-off type switching and the other one of the two switching devices is the normally-on type switching device; or
the two switching devices are the normally-on type switching devices.

12. The power converter device according to claim 7, wherein the preceding stage DC-DC conversion circuit is an isolated non-regulated DC-DC conversion circuit, and the post stage DC-DC conversion circuit is a non-isolated regulated DC-DC conversion circuit.

13. The power converter device according to claim 7, wherein the preceding stage DC-DC conversion circuit is a non-isolated regulated DC-DC conversion circuit, and the post stage DC-DC conversion circuit is an isolated non-regulated DC-DC conversion circuit.

14. The power converter device according to claim 12, wherein a part or all of the switching devices in the non-isolated regulated DC-DC conversion circuit are the normally-on type switching devices.

15. The power converter device according to claim 12, wherein at least one of the switching devices in the isolated non-regulated DC-DC conversion circuit is normally-off type switching device.

16. The power converter device according to claim 13, wherein at least one of the switching devices in the non-isolated regulated DC-DC conversion circuit is the normally-off type switching device.

17. The power converter device according to claim 13, wherein a part or all of the switching devices in the isolated non-regulated DC-DC conversion circuit are the normally-on type switching devices.

18. The power converter device according to claim 7, wherein the isolated non-regulated DC-DC conversion circuit is a resonant circuit or a pulse width modulation (PWM) circuit.

19. The power converter device according to claim 1, wherein the controller is powered by an auxiliary power supply.

20. The power converter device according to claim 5, wherein at least one of the switching devices in the post stage DC-DC conversion circuit is the normally-off type switching device which is configured to prevent reverse flowing of external current.

* * * * *